UNITED STATES PATENT OFFICE.

EDWARD R. CAMPBELL, OF NEW YORK, N. Y., ASSIGNOR TO HIMSELF AND JAMES H. CAMPBELL, OF SAME PLACE.

IMPROVEMENT IN PREPARING PIGMENTS FOR WATER-COLOR PAINTING.

Specification forming part of Letters Patent No. 119,966, dated October 17, 1871.

*To all whom it may concern:*

Be it known that I, EDWARD R. CAMPBELL, of the city, county, and State of New York, have invented an Improved Process of Preparing Pigments for Water-Color Painting.

My invention has for its object to so prepare colors for water-color painting that they may be used with the facility and in the manner of oil-colors, producing much of the beauty and richness of effect of the latter; and it consists in an improved method of preparing them, so that they will remain moist on the palette for a length of time sufficient to enable them to be used as required while painting a picture without becoming unfitted by drying.

To this end I prepare a vehicle composed of equal parts of an aqueous solution of gum arabic and glycerine, prepared in the following manner: The gum arabic is first dissolved in water to form a solution of suitable consistency for painting, and the glycerine (in equal proportion) is added by pouring it upon the solution of gum, and gently agitating the vessel containing them until a perfect amalgamation ensues.

This order of proceeding is essential, as without it the admixture cannot be effected. The dry colors are ground with this vehicle, and may then be put up in tin tubes or bottles for use and preservation, and will keep for a long period of time, and when laid on the palette will remain moist enough for use during twelve hours' or more exposure to the atmosphere.

Colors so prepared work with great facility, and remain damp after being applied sufficiently long to enable the artist to blend them with subsequent tints, and to scumble parts of the picture at pleasure. They can be thinned by using pure water if required.

This mode of preparation possesses the advantage that a painting when thoroughly dry can, by moistening with water, be restored to the control of the artist for repainting.

I claim as my invention—

The preparation of pigments used in water-color painting with a vehicle composed of glycerine and gum arabic, substantially in the proportion and manner set forth.

In witness whereof I have hereunto signed my name in the presence of two subscribing witnesses.

E. R. CAMPBELL.

Witnesses:
J. H. CAMPBELL,
K. N. JONES. (107)